US008387145B2

(12) United States Patent
Xie et al.

(10) Patent No.: US 8,387,145 B2
(45) Date of Patent: *Feb. 26, 2013

(54) BLOCKING MALICIOUS ACTIVITY USING BLACKLIST

(75) Inventors: Yinglian Xie, Cupertino, CA (US); Fang Yu, Sunnyvale, CA (US); Martin Abadi, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 895 days.

This patent is subject to a terminal disclaimer.

(21) Appl. No.: 12/479,860

(22) Filed: Jun. 8, 2009

(65) Prior Publication Data

US 2010/0313264 A1    Dec. 9, 2010

(51) Int. Cl.
  G06F 12/14    (2006.01)
  G06F 12/16    (2006.01)
(52) U.S. Cl. ............................................. 726/24; 726/25
(58) Field of Classification Search .................. None
  See application file for complete search history.

(56) References Cited

U.S. PATENT DOCUMENTS

| 7,854,001 | B1* | 12/2010 | Chen et al. ....................... 726/22 |
| 2007/0028303 | A1 | 2/2007 | Brennan |
| 2007/0074289 | A1 | 3/2007 | Maddaloni |
| 2007/0209074 | A1* | 9/2007 | Coffman ........................ 726/23 |
| 2007/0209075 | A1 | 9/2007 | Coffman |
| 2008/0256622 | A1 | 10/2008 | Neystadt et al. |

OTHER PUBLICATIONS

Hynsang Choi, Hanwoo Lee, Heejo Lee, Hyogon Kim, Botnet Detection by Monitoring Group Activities in DNS Traffic, 2007 IEEE.*
Scott W. Graham, Stephen E. Mills. Sep. 1999, Monitoring Information System to Enforce Computer Security Policies.*
Giovanni Vigna, Richard A. Kemmerer and Per Blix, Reliable Software Group Department of Computer Science, University of California Santa Barbara RAID 2001, LNCS 2212, pp. 69-84, 2001 Sringer-Verlag Berlin Heidelberg.*
Leland, et al., "Sound Practice in Intrusion Detection & Prevention using NitroSecurity", Retrieved at <<http://www.sans.edu/resources/securitylab/nitrosecurity_seclab.php>>, Dec. 24, 2008, pp. 9.
Nazario, Jose Dr., "Botnet Tracking: Tools, Techniques, and Lessons Learned", Retrieved at <<http://www.blackhat.com/presentations/bh-dc-07/Nazario/Paper/bh-dc-07-Nazario-WP.pdf>>, pp. 16, 2006 Conference Montreal.
"Blacklist", Retrieved at <<http://www.blacklist.org.au/support/index.cfm?process=DISPLAY_privacy>>, May 8, 2009, pp. 5.
"NitroView", Retrieved at <<http://nitrosecurity.com/information/products/nitroview-enterprise-security-manager/>>, May 8, 2009, pp. 4.

(Continued)

Primary Examiner — Philip Chea
Assistant Examiner — Fatoumata Traore
(74) Attorney, Agent, or Firm — Microsoft Corporation

(57) ABSTRACT

An IP (Internet Protocol) address is a directly observable identifier of host network traffic in the Internet and a host's IP address can dynamically change. Analysis of traffic (e.g., network activity or application request) logs may be performed and a host tracking graph may be generated that shows hosts and their bindings to IP addresses over time. A host tracking graph may be used to determine host accountability. This can enable host-based blacklisting instead of the traditional IP address based blacklisting. Host tracking results can be leveraged for forensic analysis to understand an attacker's traces and identify malicious activities in a post-mortem fashion. The host tracking information may be used to build a tracklist which can block future attacks.

15 Claims, 10 Drawing Sheets

OTHER PUBLICATIONS

Starr, Jeff, "Eight Ways to Blacklist with Apache's Mod_Rewrite", Retrieved at <<http://perishablepress.com/press/2009/02/03/eight-ways-to-blacklist-with-apaches-mod_rewrite/>>, Feb. 3, 2009, pp. 11.

Burke, et al., "Cost-Effectively Blocking Undesired Web and Email Traffic at the Gateway", Retrieved at <<http://de.trendmicro.com/imperia/md/content/us/pdf/products/smallbusiness/clientservermessagingforsmb/wp01idcgateway204164.pdf>>, Nov. 2006, pp. 12.

Andersen, et al., "Accountable Internet Protocol (AIP)", Retrieved at <<http://www.cs.cmu.edu/~dga/papers/aip-sigcomm2008.pdf>>, SIGCOMM'08, Aug. 17-22, 2008, pp. 12.

Anderson, et al., "Spamscatter: Characterizing Internet Scam Hosting Infrastructure", Retrieved at <<http://www.cse.ucsd.edu/~voelker/pubs/spamscatter-security07.pdf>>, pp. 14.

Bellovin, et al., "ICMP Traceback Messages", Retrieved at <<http://www.ietf.org/proceedings/03mar/I-D/draft-ietf-itrace-04.txt>>, Feb. 2003, pp. 18.

Blum, et al., "Detection of Interactive Stepping Stones: Algorithms and Confidence Bounds", Retrieved at <<http://www.cs.berkeley.edu/~dawnsong/papers/stepstone.pdf>>, pp. 20.

Burch, et al., "Tracing Anonymous Packets to their Approximate Source", Retrieved at <<http://209.85.229.132/search?q=cache:qNp4e54URU4J:www.usenix.org/event/lisa2000/burch/burch.ps+Tracing+Anonymous+Packets+to+their+Approximate+Source&cd=3&hl=en&ct=clnk&gl=in>>, 2000 LISA XIV—Dec. 3-8, 2000, pp. 16.

Casado, et al., "Peering through the Shroud: The Effect of Edge Opacity on IP-Based Client Identification", Retrieved at <<http://www.cs.princeton.edu/~mfreed/docs/illum-nsdi07.pdf>>, pp. 14.

Chiang, et al., "A Case Study of the Rustock Rootkit and Spam Bot", Retrieved at <<http://www.usenix.org/event/hotbots07/tech/full_papers/chiang/chiang.pdf>>, pp. 8.

Donoho, et al., "Multiscale Stepping-Stone Detection: Detecting Pairs of Jittered Interactive Streams by Exploiting Maximum Tolerable Delay", Retrieved at <<http://citeseerx.ist.psu.edu/viewdoc/download;jsessionid=F1C3454991C2B86BCCC65B197ECAAF11?doi=10.1.1.15.3099&rep=rep1&type=pdf>>, pp. 1-15.

Droms, R., "Dynamic Host Configuration Protocol", Retrieved at <<http://www.ietf.org/rfc/rfc2131.txt>>, Mar. 1997, pp. 43.

Ferguson, et al., "Network Ingress Filtering: Defeating Denial of Service Attacks which Employ IP Source Address Spoofing", Retrieved at <<http://www.ietf.org/rfc/rfc2827.txt>>, May 2000, pp. 10.

Gu, et al., "Botminer: Clustering Analysis of Network Traffic for Protocol- and Structure-Independent Botnet Detection", Retrieved at <<http://faculty.cs.tamu.edu/guofei/paper/Gu_Security08_BotMiner.pdf>>, pp. 16.

Gu, et al., "Botsniffer: Detecting Botnet Command and Control Channels in Network Traffic", Retrieved at <<http://faculty.cs.tamu.edu/guofei/paper/Gu_NDSS08_botSniffer.pdf>>, pp. 18.

Holz, et al., "Measurements and Mitigation of Peer-to-Peer-Based Botnets: A Case Study on Storm Worm", Retrieved at <<http://honeyblog.org/junkyard/paper/storm-Ieet08.pdf>>, pp. 9.

Killalea, T., "Internet Service Provider Security Services and Procedures", Retrieved at <<http://www.isi.edu/in-notes/rfc3013.txt>>, Nov. 2000, pp. 13.

Kohno, et al., "Remote Physical Device Fingerprinting", Retrieved at <<http://www.caida.org/publications/papers/2005/fingerprinting/KohnoBroidoClaffy05-devicefingerprinting.pdf>>, pp. 15.

Lampson, Butler, "Computer Security in the Real World", Retrieved at <<http://www.usenix.org/events/sec05/tech/lampson.pdf>>, Aug. 2005, pp. 1-26.

Li, et al. "Large-Scale IP Traceback in High-Speed Internet: Practical Techniques and Theoretical Foundation", Retrieved at <<http://www.cc.gatech.edu/~jx/reprints/IEEESP04.pdf>>, pp. 15.

Liu, et al., "Passport: Secure and Adoptable Source Authentication", Retrieved at <<http://www.cs.duke.edu/~xwy/publications/passport-draft.pdf>>, pp. 1-14.

"Nmap Free Security Scanner", Retrieved at <<http://www.insecure.org/nmap/>>, May 6, 2009, pp. 2.

"Project Details for p0f", Retrieved at <<http://freshmeat.net/projects/p0f/>>, pp. 4, Dec. 12, 2006.

Ramachandran, et al., "Understanding the Network-Level Behavior of Spammers", Retrieved at <<http://www.cc.gatech.edu/~avr/publications/p396-ramachandran-sigcomm06.pdf>>, SIGCOMM'06, Sep. 11-16, 2006, pp. 12.

Ramachandran, et al., "Revealing Botnet Membership using DNSBL Counter-Intelligence", Retrieved at <<http://www.cc.gatech.edu/~feamster/publications/dnsbl.pdf>>, pp. 6.

Ramachandran, et al., "Filtering Spam with Behavioral Blacklisting", Retrieved at <<http://www.cc.gatech.edu/~feamster/papers/bb-ccs2007.pdf>>, CCS'07, Oct. 29-Nov. 2, 2007, pp. 10.

"Route Views Project", Retrieved at <<http://www.routeviews.org>>, May 4, 2009, pp. 4.

Savage, et al., "Practical Network Support for IP Traceback", Retrieved at <<http://www.eecg.toronto.edu/~ashvin/courses/ece1746/2003/reading/savage-sigcomm00.pdf>>, SIGCOMM'00, pp. 12.

Snoeren, et al., "Hash-Based IP Traceback", Retrieved at <<http://www.ccert.edu.cn/upload/4/30.pdf>>, SIGCOMM'01, Aug. 27-31, 2001, pp. 3-14.

"Spamhaus Policy Block List (PBL)", Retrieved at <<http://www.spamhaus.org/pbl/>>, May 6, 2009, Page.

Reed, et al., "Anonymous Connections and Onion Routing", Retrieved at <<http://www.onion-router.net/Publications/JSAC-1998.pdf>>, pp. 1-15.

"Trojan Now uses Hotmail, Gmail as Spam Hosts", Retrieved at <<http://news.bitdefender.com/NW544-en--Trojan-Now-Uses-Hotmail-Gmail-as-Spam-Hosts.html.>>, Aug. 8, 2007, pp. 2.

Wang, et al., "Robust Correlation of Encrypted Attack Traffic through Stepping Stones by Manipulation of Inter-Packet Delays", Retrieved at <<http://cs.gmu.edu/~xwangc/Publications/CCS2003-IPDWMCorr.pdf>>, CCS'03, Oct. 27-30, 2003, pp. 10.

Xie, et al., "How Dynamic are IP Addresses", Retrieved at <<http://ccr.sigcomm.org/drupal/files/fp179-xie.pdf>>, SIGCOMM'07, Aug. 27-31, 2007, pp. 12.

Xie, et al., "Spamming Botnets: Signatures and Characteristics", Retrieved at <<http://ccr.sigcomm.org/online/files/p171-xie.pdf>>, SIGCOMM'08, Aug. 17-22, 2008, pp. 171-182.

Zhang, et al., "Detecting Stepping Stones", Retrieved at <<http://www.cs.jhu.edu/~fabian/courses/CS600.424/course_papers/Stepping-Stones.pdf>>, pp. 1-11, Aug. 2000.

Zhuang, et al., "Characterizing Botnets from Email Spam Records", Retrieved at <<http://www.usenix.org/event/leet08/tech/full_papers/zhuang/zhuang.pdf>>, pp. 9.

* cited by examiner

BLOCKING MALICIOUS ACTIVITY USING BLACKLIST

BACKGROUND

The Internet, a network of distributed computers and computerized devices, is designed to be open and anonymous. By obtaining an IP (Internet Protocol) address, a host can easily connect to the Internet and freely talk to other hosts without exposing its real identity. This open and anonymous architecture, which enabled the Internet to expand quickly, is also a source of security concerns. Attackers can easily hide their real identities behind IP addresses.

Dynamic IP address assignment poses challenges to the commonly used IP-based approach to detect, blacklist, and block malicious traffic. When an attacker changes its IP address, legitimate activities that subsequently use the old IP address will be misclassified as bad, while malicious activities from the new IP address will slip through. The numerous NAT (network address translation) devices and HTTP (Hypertext Transfer Protocol) proxies also imply that blacklisting can result in denial of service to many legitimate clients that share IP addresses with attackers.

A botnet is a term generally used to refer to a collection of compromised computers (called "zombie computers" or "bots") which serve as hosts to running malicious software ("malware"), under a common command and control infrastructure. Generally, a botnet proliferates over a network autonomously and automatically, and the botnet's originator can control the group remotely, typically for nefarious purposes. The Internet is extremely dynamic, and this dynamicity is exploited by botnets which constantly relocate within an IP address space without actually migrating to another computer.

The transient nature of the attacks and the dynamics of IP address assignment make it difficult to pinpoint the exact compromised host entities as their IP addresses change. Security rests on host accountability, which is the ability to identify the hosts responsible for traffic, which is typically the basis for punishing misbehavior. It is commonly believed that today's Internet architecture provides no host accountability and that architectural changes are necessary in order to support it.

Host accountability in the Internet has long been a topic of substantial interest. A large body of previous work has focused on providing source accountability to identify the true network origin of traffic. In this area, a few early efforts have proposed solutions to detect stepping stone attacks by packet timing analysis and content analysis. Source address spoofing is also commonly leveraged to hide attacker identities, especially in DoS (denial of service) attacks. Ingress and egress filtering, which have been partially deployed, can prevent source-address spoofing. Other proposed approaches also require changes to the existing routers or the routing infrastructure. Among them, IP-traceback techniques were proposed to determine the source(s) of packets received by storing additional states at routers or marking packets along their paths.

In order to prevent unwanted traffic from a compromised host, blacklists representing hosts by IP address have been widely used in practice. Recent studies have shown a significant fraction of the Internet IP address space is dynamic and that the number of proxies and NATs is non-trivial. It is difficult to effectively apply blacklists In the presence of dynamic IP addresses, proxies, and NATs.

SUMMARY

An IP (Internet Protocol) address is a directly observable identifier of hosts in the Internet and a host's IP address can dynamically change. Analysis of traffic (e.g., network activity or application request) logs may be performed and a host tracking graph may be generated that shows hosts and their bindings to IP addresses over time. A host tracking graph may be used to determine host accountability. To generate a host tracking graph, a host is represented by identifiers. These identifiers may be application-dependent.

In an implementation, a host tracking system may track the bindings between hosts and IP addresses over time despite the existence of dynamic IP addresses, proxies, and NATs. The system may track host IP bindings by mining application-level activity logs and may perform host-level classification of network activity. This can enable host-based blacklisting instead of the traditional IP address based blacklisting.

In an implementation, host tracking results can be leveraged for forensic analysis to understand an attacker's traces and identify malicious activities in a postmortem fashion. In an implementation, the host tracking information may be used to build a tracklist in realtime, which can block future attacks and also share information across applications. In both postmortem blacklisting and tracklisting, host tracking information is used to blacklist malicious traffic and activities at the host level instead of at the IP address level.

This summary is provided to introduce a selection of concepts in a simplified form that are further described below in the detailed description. This summary is not intended to identify key features or essential features of the claimed subject matter, nor is it Intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
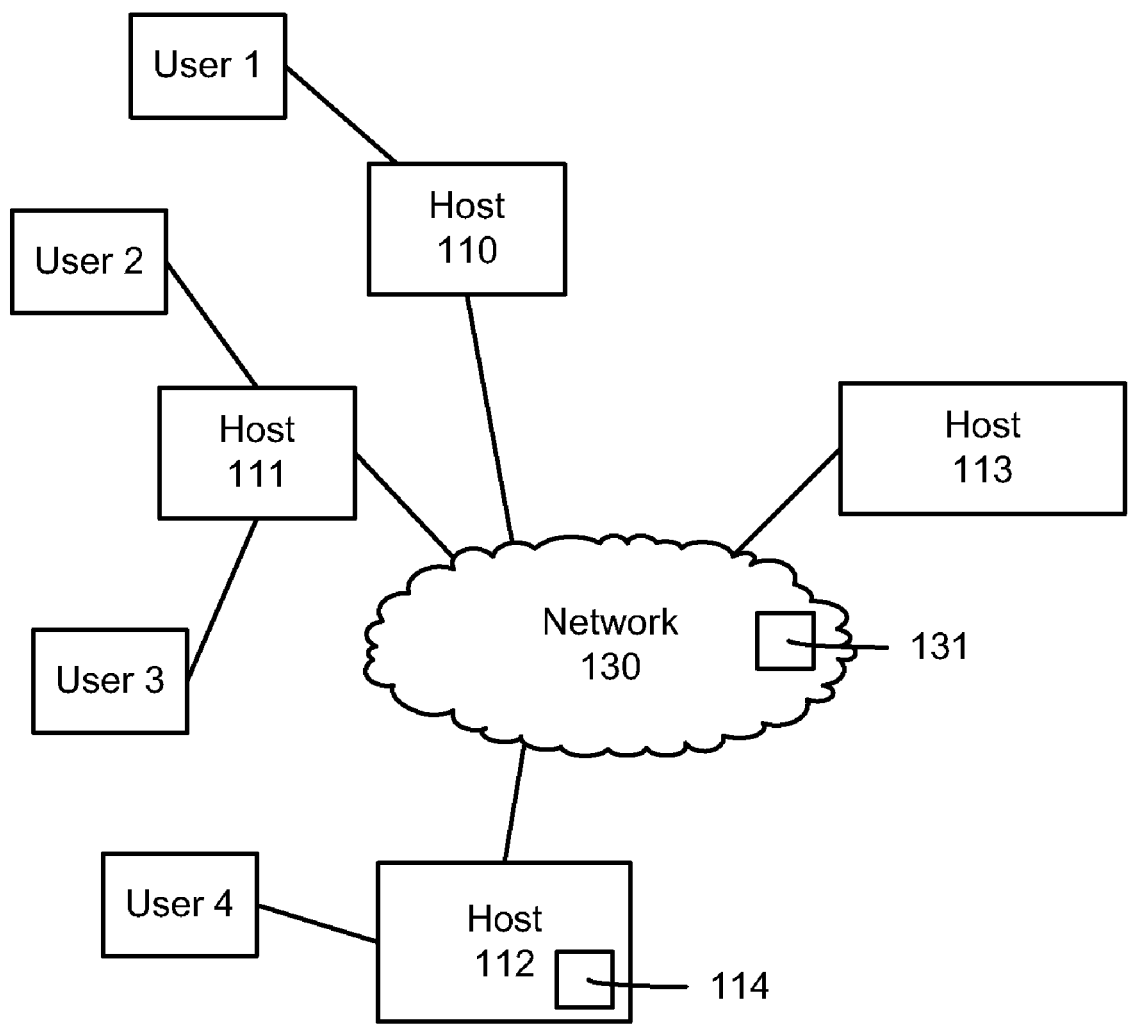
FIG. 1 illustrates an exemplary environment.

FIG. 1 illustrates an exemplary environment 100 that includes host computers 110, 111, 112, 113) connected to a network 130, for example, the Internet, a wide area network (WAN) or local area network (LAN). The network 130 provides access to services such as the World Wide Web (the "Web") 131. The Web 131 allows one host (e.g., 112) to access documents containing text-based or multimedia content contained in Web pages, data, documents, and/or objects maintained and served by the one or several other hosts (e.g., 110, 111, 112, 113). Typically, this is done with an application 114 (e.g., a browser application program, a network-enabled application program, an email client application, a file transfer client, etc.) executing in the host.

The technology infrastructure of the Web 131 may include server-software, content-syndication, messaging protocols, standards-based browsers with plugins and extensions, and various client applications. These differing, yet complementary approaches provide the Web 131 with a growing set of information storage, creation, and dissemination capabilities.

Users 1, 2, 3, and 4 are shown in FIG. 1 and may use host 110, 111, 112, 113 (e.g., by logging in to one or more of the hosts 110, 111, 112, 113) to access content on, or interact with, one or more of other hosts, as described further herein. Although only four users and four hosts are shown in FIG. 1, any number of users and hosts may be implemented and used with respect to aspects and embodiments described herein.

An IP address is a directly observable identifier of hosts in the Internet and a host's IP address can dynamically change. As described further herein, a posteriori analysis of traffic (e.g., network activity or application request) logs may be performed and a host tracking graph may be generated that shows hosts and their bindings to IP addresses over time. A host tracking graph may be used to determine host accountability.

Figure 2:
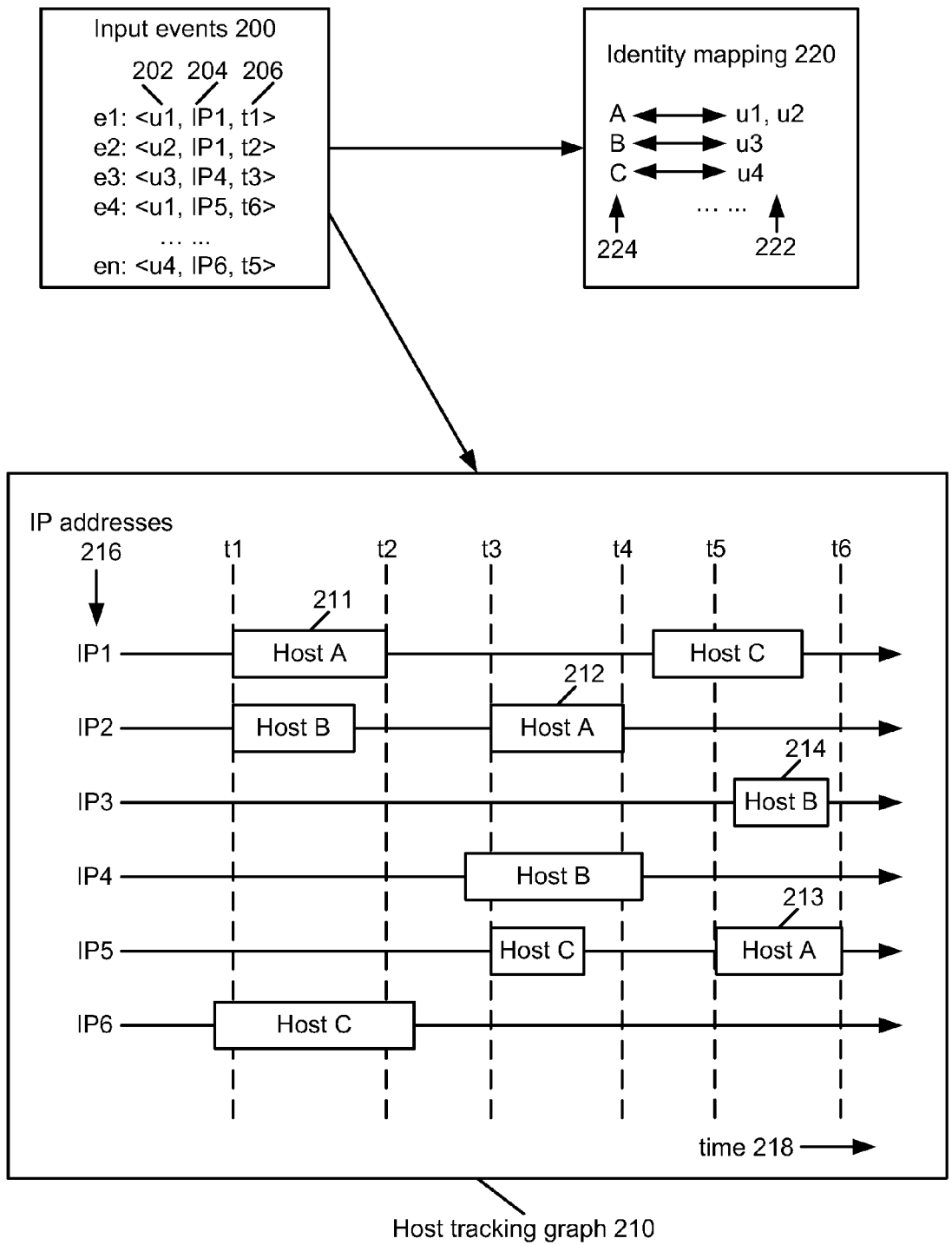
FIG. 2 illustrates an example host tracking graph with input events and an identity mapping.

FIG. 2 illustrates an example host tracking graph 210 with input events 200 and an identity mapping 220 involving three different hosts A, B, and C. Time advances from left to right, with each rectangle box representing the binding between a host and an IP address across a time range. In this example, host A was bound to IP address IP1 during time range [t1,t2] as shown by box 211. Later, host A moved to IP2 and IP5 during time ranges [t3,t4] and [t5,t6], respectively, as shown by boxes 212 and 213. The time range during which a host is bound to an IP address may be defined as a binding window. For example, the binding window from host A to IP1 is [t1,t2].

Host accountability may be determined using a host tracking graph. In an implementation, for any network traffic originating from an IP address IPi at time tj, if there exists a binding window that includes tj from a host H to IPi, then the host H may be held accountable for such traffic. In an implementation, if host H is known to have bound to a different IP address IPk at tj, then it may be concluded that host H is not responsible for generating any traffic from IPi at time tj. Note that the bindings from an IP address to various hosts may not be continuous, since hosts may not be up all the time and there may also exist unassigned IP addresses. For example, there are no hosts bound to address IP3 before time t5 in the host tracking graph 210 of FIG. 2, as shown by box 214.

To generate a host tracking graph, a host is represented by identifiers. Host representations may be application-dependent. In an implementation, application-level identifiers (IDs) such as user email IDs, messenger login IDs, social network IDs, or cookies may be used. Each such identifier is typically associated with a human user, such as users 1, 2, 3, or 4 of FIG. 1. These unreliable IDs can be used to track the activity of the corresponding end-host activities. For example, a browser cookie appearing in requests from different IP addresses and different timestamps may suggest that the corresponding host has connected to the Internet at different times with different Dynamic Host Configuration Protocol (DHCP) IP addresses. Identifiers may also be anonymized versions of user IDs. In such a case, for example, each login address or ID may be replaced with a unique distinct number as its identifier.

Using application-level IDs to represent hosts is unreliable. Often, one user and hence one host may be associated with multiple application IDs. Furthermore, users can keep signing up new IDs, and a group of hosts can also share an ID if they are controlled by a common user. Reliable host entities may be derived using unreliable application IDs, and a host tracking graph may be generated.

As shown in FIG. 2, the input events 200 may comprise a sequence of network or application activity events e1, e2, ..., en over time. In an implementation, each event may comprise three fields: a unique unreliable ID (represented by ui 202), an IP address (represented by IPi 204), and the timestamp when the ID is observed being associated with the corresponding IP address (represented by ti 206). Taking a set of events (e.g., the input events 200) as input, two outputs may be generated: an identity mapping table (e.g., the identity mapping 220) that represents the mappings from unreliable IDs to reliable host entities (e.g., unreliable IDs 222 to reliable hosts 224), and a host tracking graph that tracks each host's activity across different IP addresses over time (e.g., the host tracking graph 210 showing activities on IP addresses 216 over time 218).

Figure 5:
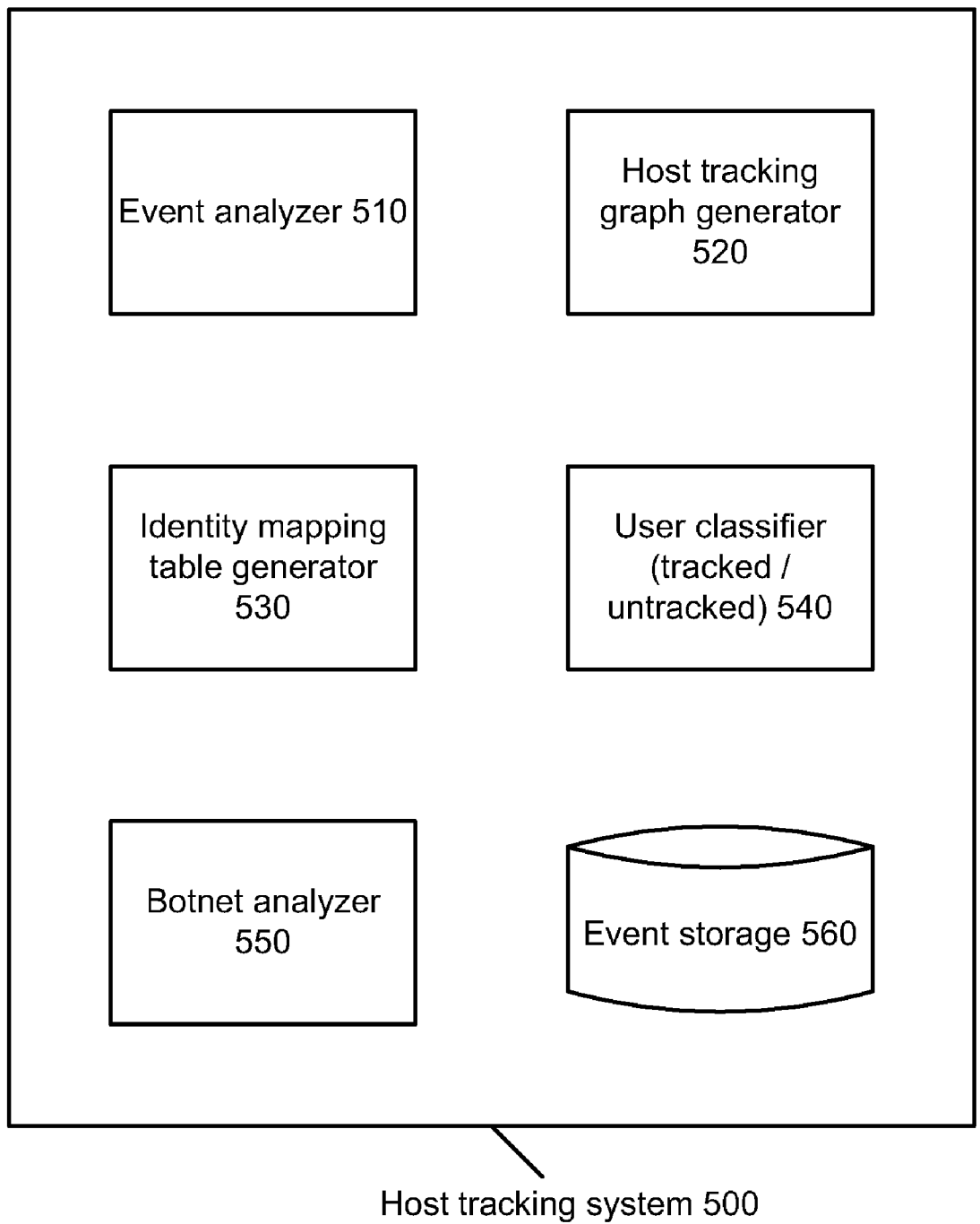
FIG. 5 is a block diagram of an implementation of a system that may be used to determine host accountability using host tracking and a host tracking graph.

To represent a host, a host tracking system (an implementation of which is described further with respect to FIG. 5) may adopt the group of user IDs that is associated with a host to serve as a virtual ID for the host in order to keep track of the related activities. Stable, non-proxy users may be useful for this purpose, and are referred to as tracked user IDs. Ephemeral users or proxy-only user IDs may not help establish host IP binding changes and are called untracked user IDs. Tracked events refer to the set of events that can be eventually attributed to certain responsible host entities in the host tracking graph, and the rest of the events are untracked events. In an Implementation, a goal is to maximize the number of tracked events while ensuring that the tracking is accurate.

Untracked users who travel frequently (i.e., log in from different IP addresses or IP address ranges) may be more suspicious and may likely be botnet created accounts. For example, it has been found that for users who logged in from at least about 10 IP ranges, for the tracked user IDs, despite the fact that they logged in from a large number of IP address ranges, the majority of the users sent only one email throughout the entire month. However, for the untracked users, the number of emails sent was about 20 emails per user. The strong correlations of the email sending statistics may be due to coordinated botnet activities.

Without prior knowledge of which subset of user IDs are tracked, the identity mapping 220 may be regarded as a hidden model to be estimated. As described further herein, the estimations may be iteratively updated so that the identity mapping 220 fits the actual observation of the activity events from the input data.

Figure 3:
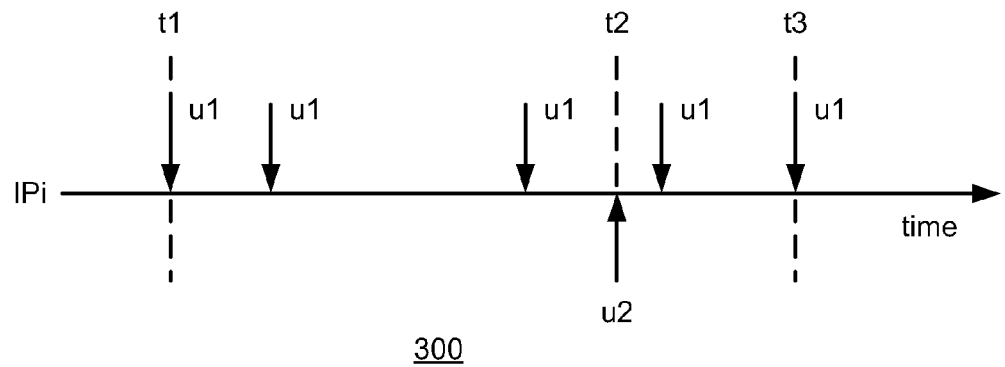
FIG. 3 illustrates an example set of Input events.

For example, assume that each user ID is a tracked user ID that maps to a unique host. FIG. 3 illustrates an example set of input events (an example input of six user login events) shown on a timeline 300. The input events are represented as vertical arrows from user u1 and u2 at IP address IPi. As shown, user u1 logged in five times from time t1 to time t3 and user u2 logged in at the same IP address at time t2.

IP address assignment in a large IP range is typically either random or static. In the random address assignment case, the probability of a host obtaining the same IP address in two different connections in a network range is usually very small. Therefore, it is highly likely that the host corresponding to user u1 is bound to IP address IPi throughout the duration between times t1 and t3, including time t2. However, under the assumption that each user uniquely maps to a different host, there exists another host corresponding to user u2, which also binds to the same IP address IPi at time t2.

Naive one-to-one identity mappings thus lead to two events that are inconsistent with each other, suggesting that the identity mapping table should be re-estimated. To do so, three possibilities may be considered: (1) multiple user IDs share a host, and in this case users u1 and u2 both map to one common host (e.g., either created by one human user or used by different family members), (2) IP address IPi is a proxy box associated with multiple host entities behind it, and (3) user u2 is a guest user (e.g., either a real guest account or introduced by an attacker) to the host associated with user u1. The three cases may be differentiated and the number of events that are eventually tracked may be maximized with as few inconsistent events as possible.

Figure 4:
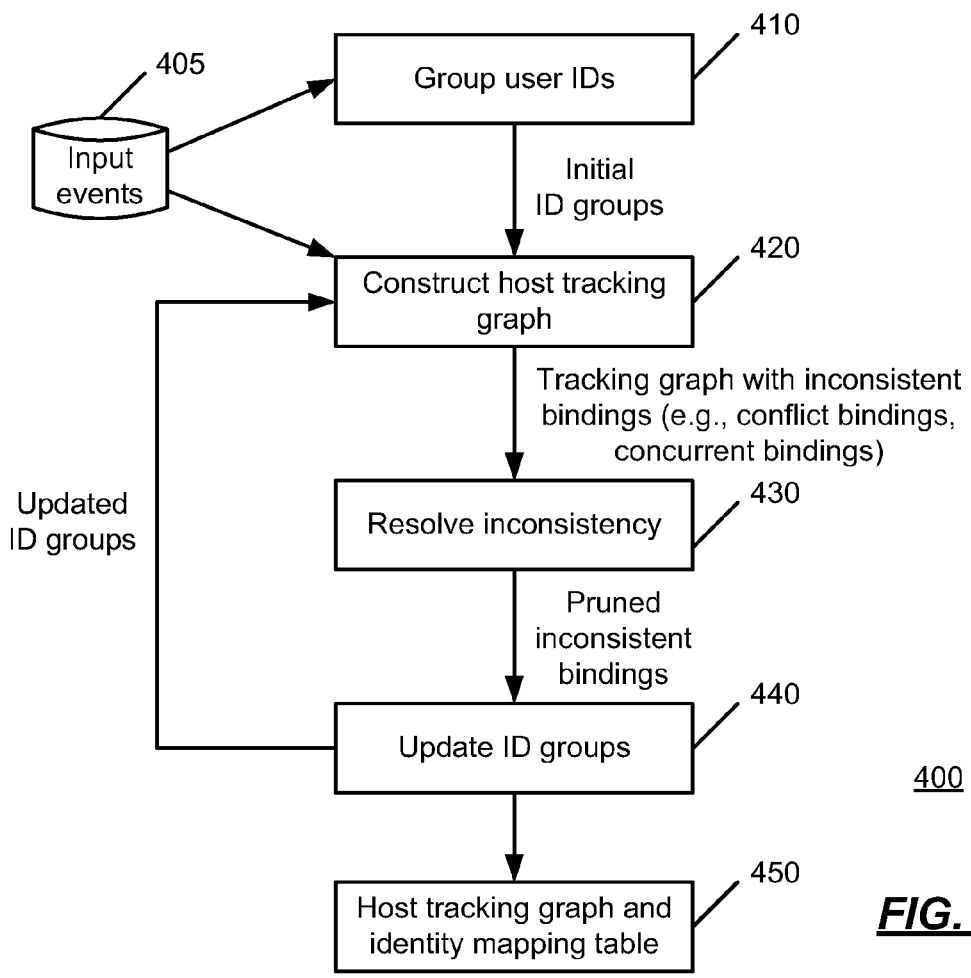
FIG. 4 is an operational flow of an implementation of a method of determining a host tracking graph.

FIG. 4 is an operational flow of an implementation of a method 400 of determining a host tracking graph using a host tracking system. The host tracking system maintains a set of user ID groups and initially each user ID is assumed to be tracked. At 410, input events 405 may be obtained from storage and some user IDs pertaining to the input events may be grouped. In an implementation, a probabilistic estimated model may be used to initialize tracked ID groups by grouping together user IDs that are correlated in their login patterns.

With respect to application ID grouping, to derive host IP bindings using application IDs (e.g., user IDs), an initial set of ID groups may be determined so that each group, with high probability, is associated with one common host. In an implementation, a probabilistic model may be used to compute the probability of users belonging to one host based on their login statistics.

If a group of users all logged in from one host, their login events will show strong correlations, e.g., appearing next to each other in time at a similar set of IP addresses. For example, if user u1 logged in ten times at ten different IP addresses, and user u2 logged in nine times, and among these login events, user u1 and user u2 appeared together eight times at eight different IP addresses, then they are very likely to share one host.

However, by random IP address assignment, two irrelevant users might also appear together in time if they happened to have connected to the Internet consecutively at a common IP address. In particular, in the case of proxy, two different users that repeatedly use a common proxy (proxies may have dynamic IP addresses) might also have a large number of nearby login events.

To quantitatively determine the probability of two independent user IDs appearing together, each host's connection (hence the corresponding user login) to the network may be taken to be a random independent event. Given a sequence of login events from a user u1, the number of times another user u2 logged in right before or after user u1 follows a binomial distribution. Specifically, let n1 denote the number of neighboring login slots to user u1, then the probability of user u2 appearing k or more times in these slots can be approximated using Equation (1):

$$P(u1, u2) = 1 - \sum_{i=0}^{k-1} C_{n_1}^i p2^i (1-p2)^{(n_1-i)} \quad \text{Equation (1)}$$

Here, $C_{n_1}^i$ is the binomial coefficient, representing the number of i-combinations (each of size i) from a set of n1 elements. p2 is the probability of user u2 logging in. With a total of c login events and a total of c2 login events from u2, p2 may be approximated as shown by Equation (2):

$$p2 = \frac{c2}{c} \quad \text{Equation (2)}$$

A very small P(u1,u2) means there is very little chance for user u1 and user u2 to log in consecutively to each other k times if they are independent, suggesting that users u1 and u2 might be correlated instead. In an implementation, this correlation test may be performed for all pairs of users that log in next to each other at least twice, and may select a pair (u1,u2) as a correlated user ID pair if P(u1,u2) is smaller than a predetermined threshold.

For example, if user u2 logged in 30 times out of 230 total logins, then p2=0.13. In this case, if users u1 and u2 logged in together five times out of a total of n1=38 neighboring slots for user u1, then the probability of them appearing together in a random assignment is as high as 0.09. The two users may not be grouped in this case. In an implementation, the probability threshold may be set to 0.05, but the threshold can be more systematically tuned based on the login event patterns from each IP range. Once the pairs of correlated users have been identified, they may be grouped. If user ID pair (u1,u2) and (u2,u3) are both correlated pairs, then the three users may be grouped into a correlated user set {u1,u2,u3}. This process may continue until there are no more groups that can be further expanded. At this stage, each set of expanded ID groups are potentially tracked. For the remaining user IDs that cannot be grouped, each user may be regarded as a tracked group if the user has logged in at least twice throughout the input duration. Both sets are merged together for further analysis. In the next operations, the set may be iteratively pruned and updated.

At 420, a host tracking graph may be constructed using the current estimations. In an implementation, each application ID group obtained from operation 410 may be regarded as a candidate host identifier. A host tracking graph may be constructed using these ID groups as follows.

For each group U, the first timestamp t1 and the last timestamp t2 that any user from group U logged in at IP address IPi are identified and used to define the binding window w=[t1, t2] from group U to IP address IPi. The binding is determined as G(U,w)=IPi. Formally, in an implementation, a host tracking graph may be defined as G: H×T→IP, where H is the space of all hosts on the Internet, T is the space of time, and IP is the IP address space. For example, if host h ∈ H is bound to IP address IP1 ∈ IP at time t ∈ T, this binding may be represented as G(h,t)=IP1. Similarly, G(h,w)=IP1 when G(h,t)=IP1 for all t ∈ w.

Inconsistent bindings may then be determined. There are two types of inconsistent bindings: conflict bindings and concurrent bindings. A conflict binding occurs when two user groups concurrently use the same IP address. For example, for any two bindings G(U1,w1)=IPi and G(U2,w2)=IPi, where w1=[t1,t2] and w2=[t3,t4], if time t3≦time t2 and time t1≦time t4, the overlapped time range between w1 and w2 may be determined to be w. Both G(U1,w)=IPi and G(U2,w)=IPi may then be identified as conflict bindings.

A concurrent binding occurs when a user group concurrently uses two different IP addresses. For example, for two bindings G(U1,w1)=IPi where w1=[t1,t2], and G(U1, w2)=IPj where w2=[t3,t4], if IPi≠IPj and w1 and w2 overlap, then similar to the conflict binding case, the overlapped time range w may be determined, and both G(U1,w)=IPi and G(U1,w)=IPj may be identified as concurrent bindings.

At 430, inconsistent bindings may be resolved (i.e., removed). Inconsistent bindings can be caused by the existence of NATs or proxies, guest login events from untracked IDs, or an incorrect grouping, for example.

Proxy identification can be used to resolve conflict bindings. Because large NATs or proxies allow hosts to concurrently access the Internet, they will generate a large number of conflict bindings. Depending on the network configurations, proxies or NATs can be set up to use either static or dynamic IP addresses. For example, a DSL-based Internet cafe may change its IP addresses from time to time.

To find both types of proxies and NATS, the overlapped conflict binding windows associated with a common IP address may be gradually expanded. Such expansion obtains a maximum continuous conflict window with a large number of conflict bindings. For example, if G(U1,w1)=IPi and G(U2,w2)=IPi, and the conflict windows w1 and w2 overlap with each other, then the two windows may be merged into an expanded conflict window.

For each expanded conflict window, a degree of event concurrency may be determined. A conflict window may be selected as a proxy binding window if the rate of new user arrivals is greater than α (new users/time) and the rate of conflict bindings is higher than β (conflict bindings/time), where in an implementation, α is set to 1 new user per 5 minutes and β is set to 1 conflict binding per 30 minutes, though α and β may be set to other values depending on the implementation.

After a proxy binding window is identified, the events occurring during the window may be determined to be proxy events. Proxy events may be treated as tracked events, with the corresponding proxy box as their traffic origin in the Internet. In practice, this can significantly reduce the number of conflict bindings (e.g., reduce the number of conflict bindings by more than 90%).

A tracked user group and an untracked user group may concurrently appear at a same IP address, resulting in conflict bindings. In an implementation, in case (1) the untracked user login is a guest login event, and in this case the tracked user group represents the correct host, in case (2) the untracked user group and the tracked group share a host, but they were not grouped previously due to the Infrequent logins from the untracked users, or in case (3) the tracked user login is a guest event.

Events from the untracked group may be treated as guest events to resolve the conflict. This is because in both cases (1) and (2) the guest login events from the untracked group will be correctly attributed to the host corresponding to the tracked group. In practice, case (3) seems to be rare.

Overall, guest event conflict bindings typically are only a small fraction of the total inconsistent events. However, their responsible host entities may be identified because a large number of malicious events may appear as guest events on compromised tracked hosts.

In an implementation, splitting groups may be used to resolve concurrent bindings. A user ID group having a large number of concurrent bindings suggests that the initial grouping operation might be overly aggressive in grouping IDs together from different hosts. For each group that had more than one concurrent binding, the grouping may be adjusted by splitting the subset of IDs that triggered concurrent login events into a different ID group.

At 440, ID groupings may be updated and the updated ID groups may be fed back into the host tracking graph construction process at 420 in an iterative way, until the estimated model converges (e.g., the ID groupings cannot be reduced or updated further). The final output is a host tracking graph 450 with a corresponding identity mapping table.

More particularly, with the knowledge of proxies, guest events, and the split groups, the initial identity mappings may be re-estimated by pruning the groups that became untracked. The proxy-only users or guest-only users are now untracked.

It is noted that the order of the pruned users may affect the final set of remaining tracked IDs. If a tracked user is incorrectly identified as a guest untracked user, then its events are regarded as untracked. To maximize the number of tracked events, only proxy groups are pruned initially, in an implementation. The remaining groups may then be iteratively refined using the above-described operations. In practice, for most IP ranges, the number of tracked groups converges after about four to six iterations.

At this point, for the remaining inconsistent bindings, the events may be discarded from these inconsistent bindings and treated as untracked events.

For the tracked bindings, their actual binding windows may be much longer than the binding windows derived from login events only. So their window sizes may be expanded to increase the coverage. For example, for a host IP binding G(A[t1,t2])=IPi, its window expansion is subject to the constraints of it cannot expand beyond the boundaries of the previous and next binding windows of the same host, nor can it expand beyond the boundaries of the previous and next binding windows on the same IP address. Under the constraints, the binding window size may be increased by an amount of time (e.g., by 30 minutes, one hour, two hours, etc. both forward and backward in time).

The identity mapping table and the host tracking graph may be outputted with expanded binding windows. The set of input events that can be attributed to certain hosts may be referred to as tracked events, and the remaining events may be referred to as untracked events. Correspondingly, the IDs that are used to represent hosts in the identity mapping table may be referred to as tracked IDs, and the group of IDs that all map to one unique host may be referred to as a tracked ID group.

In an implementation, users may travel and hence either move their hosts around (e.g., using laptops, handheld computing devices, etc.) or use different hosts (e.g., using office desktop computers vs. using home computers). A stable user usually has just a few (or one or two, for example) IP ranges where they access the Internet frequently, but may occasionally travel to other locations. Thus, although users may log in from many different network locations, it may be expected that a majority fraction of the normal user IDs will be classified as part of a tracked group at only one or two or a few IP address ranges.

The mobility of tracked users vs. untracked users may be compared. While it is plausible for a legitimate user to travel a lot and hence be associated with many different login IP ranges, those untracked users that also logged in from a large number of IP ranges are highly suspicious. These transient and distributed user IDs are highly characteristic of botnet attacks and may be suspected to be email spamming accounts signed up by botnet attackers, for example.

The host tracking results provide information for network security. The information regarding malicious host population behind an IP range is useful for online applications such as video streaming and gaming services for detecting DoS attacks. Previously, it has been difficult to estimate the number of compromised hosts solely by IP address due to the dynamic IP effect. For example, even if there is only one bad host in a range, it can change IP addresses and use different user IDs every day, thus appearing to be many active hosts. With host tracking results, the number of malicious hosts may be accurately determined using the information regarding the host bindings.

Figure 6:
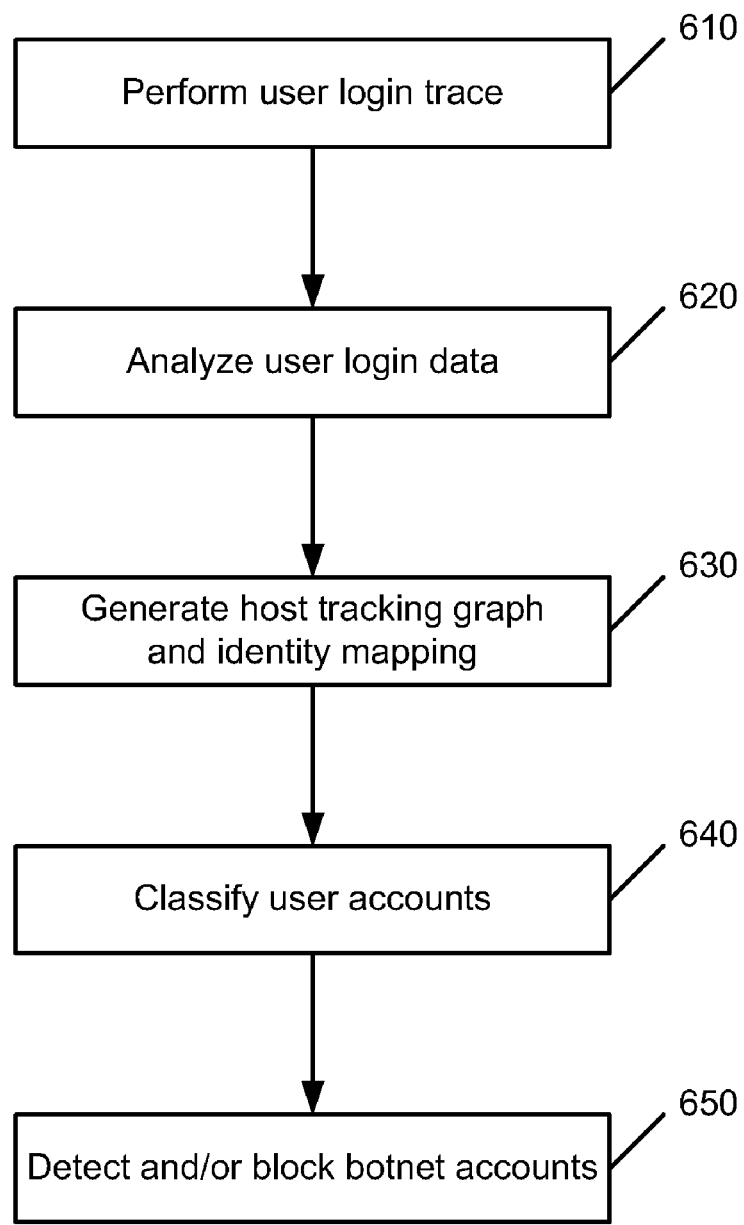
FIG. 6 is an operational flow of an implementation of a method of determining host accountability using host tracking.

FIG. 5 is a block diagram of an implementation of a system 500 that may be used to determine host accountability using a host tracking graph, and FIG. 6 is an operational flow of an implementation of a method 600 of determining host accountability using host tracking.

The host tracking system 500 may comprise a computing device or be comprised within a computing device (such as a computing device 1100 described with respect to FIG. 11) and may comprise a memory or other storage such as event storage 560. In an implementation, user email IDs may be taken as application IDs and user login events may be the input events, e.g., which the host tracking system 500 obtains and stores in event storage 560. The host tracking system 500 may receive user login data from a service (e.g., an email service login data for a predetermined amount of time in the past, such as one month, two months, etc.) and store the user login data in the event storage 560. In an implementation, the host tracking system 500 may perform a user login trace at 610 to obtain a certain amount of login data (e.g., one month, two months, etc. of user login data from an email service).

At 620, the user login data may be analyzed using an event analyzer 510. The event analyzer 510 may analyze the IDs and/or events using techniques such as those described with respect to the method 400, for example.

The event analyzer 510 may provide its output to a host tracking graph generator 520 and an identity mapping table generator 530 which generate a host tracking graph and an identity mapping (mapping user IDs to hosts) such as those described above with respect to FIGS. 2 and 4, for example. Such generation may be performed at 630 using techniques described herein.

In an implementation, host tracking may be performed on an IP range-by-range basis, where the range information can be derived from the border gateway protocol (BGP) table prefixes or who is database entries, for example. Typically, the different bindings between normal user IDs and IP addresses within a range may originate from the same host. For user IDs that appear across multiple ranges, the different user ID IP bindings may also be triggered by user mobility rather than host mobility. Therefore, in an implementation, the host tracking system 500 may analyze events from each range independently.

At 640, each user account may be classified as being a tracked user account or an untracked user account. A user classifier 540 may be used to perform the techniques described above to output a set of tracked and untracked user accounts.

Such output may be used to detect and/or block botnet accounts and determine host accountability for such traffic and activity. In an implementation, untracked users may be associated with botnet activities. At 650, a botnet analyzer 550 may use the host tracking graph and the user account classification to detect and/or block botnet accounts and determine the hosts that are accountable using techniques described above.

In an implementation, the host tracking system 500 may track the bindings between hosts and IP addresses over time despite the existence of dynamic IP addresses, proxies, and NATs. The system 500 may track host IP bindings by mining application-level activity logs and may perform host-level classification of network activity. This can enable host-based blacklisting instead of the traditional IP address based blacklisting. This type of blacklisting may use tracklists that leverage the host IP binding information for blocking malicious traffic. Instead of blacklisting an IP address, tracklisting tracks the compromised host activities and can blacklist malicious traffic (e.g., activities) even when the host IP address changes. It can also differentiate botnet accounts from legitimate accounts to prevent blocking service to legitimate users.

In a typical large-scale botnet attack, attackers may use botnet hosts to sign up millions of user accounts from large free email service providers and may subsequently use them for spamming purposes. Detecting these large quantities of malicious accounts has been challenging, as each account is used to send only a small number of emails and thus may appear to be legitimate (non-malicious).

In many applications, it may be useful to generate user statistics to help understand normal user behavior and distinguish abnormal activities. However, malicious user IDs can pollute the data, especially when attackers sign up millions of accounts.

Host tracking results can be used to accurately infer compromised host numbers and botnet sizes and can be used to build normal user profiles and statistics. The normal user profiles and statistics are useful to understand normal user behavior and may distinguish abnormal or malicious activity. The information regarding malicious host population associated with an IP address range may be used by online applications such as video streaming and gaming services for detecting DoS attacks. The number of hosts may be compared with the number of IP addresses used. The number of IP addresses may be significantly larger than the actual host population size. For large botnets, the number of IP addresses that they use may be two to three orders of magnitude bigger than the actual host number. The information from the host tracker system may be used to identify and blacklist malicious hosts using known bad accounts.

It may be determined whether tracked user accounts identified by the host tracker system 500 are normal (non-malicious or legitimate) user accounts or malicious user accounts. The overlap between the tracked user accounts and known malicious user IDs may be determined and it has been found that only a small percentage (e.g., about 0.02%) of the tracked user accounts are known malicious. This suggests that tracked user accounts are highly likely to be normal user accounts. Such information may be used to build normal user profiles.

The profile of normal user accounts can be dramatically different from that of malicious IDs. Furthermore, the user profiles of different IP address ranges can be noticeably different. For example, with respect to signup time, tracked user IDs are signed up continuously over years, while malicious user IDs are signed up during a very short time frame. This is because attackers usually rent a botnet for a short duration, during which the signup activity is intensive. As another example, with respect to signup country code, when signing up, users are asked to input the country code. Although some legitimate users may choose to enter a fake or incorrect country code, when analyzing all tracked users of an IP address block, the correct country codes are typically provided by most tracked users.

User profiles can be leveraged to differentiate valid (normal) user IDs and malicious user IDs. In an implementation, the probability of a user ID being a malicious user may be determined along with the probability of the user being a tracked user. If the ratio of the probability of being a malicious user over the probability of being a legitimate user Is more than a threshold (e.g., set equal to two times the difference), the user ID may be regarded as a malicious user ID.

Host tracking results can further be leveraged for forensic analysis to understand an attacker's traces and identify malicious activities in a postmortem fashion. Additionally, the host tracking information may be used to build a tracklist, which can block future attacks and also share information across applications. In both postmortem blacklisting and tracklisting, described further herein, host tracking information is used to block malicious traffic and activities at the host level instead of at the IP address level.

Figure 7:
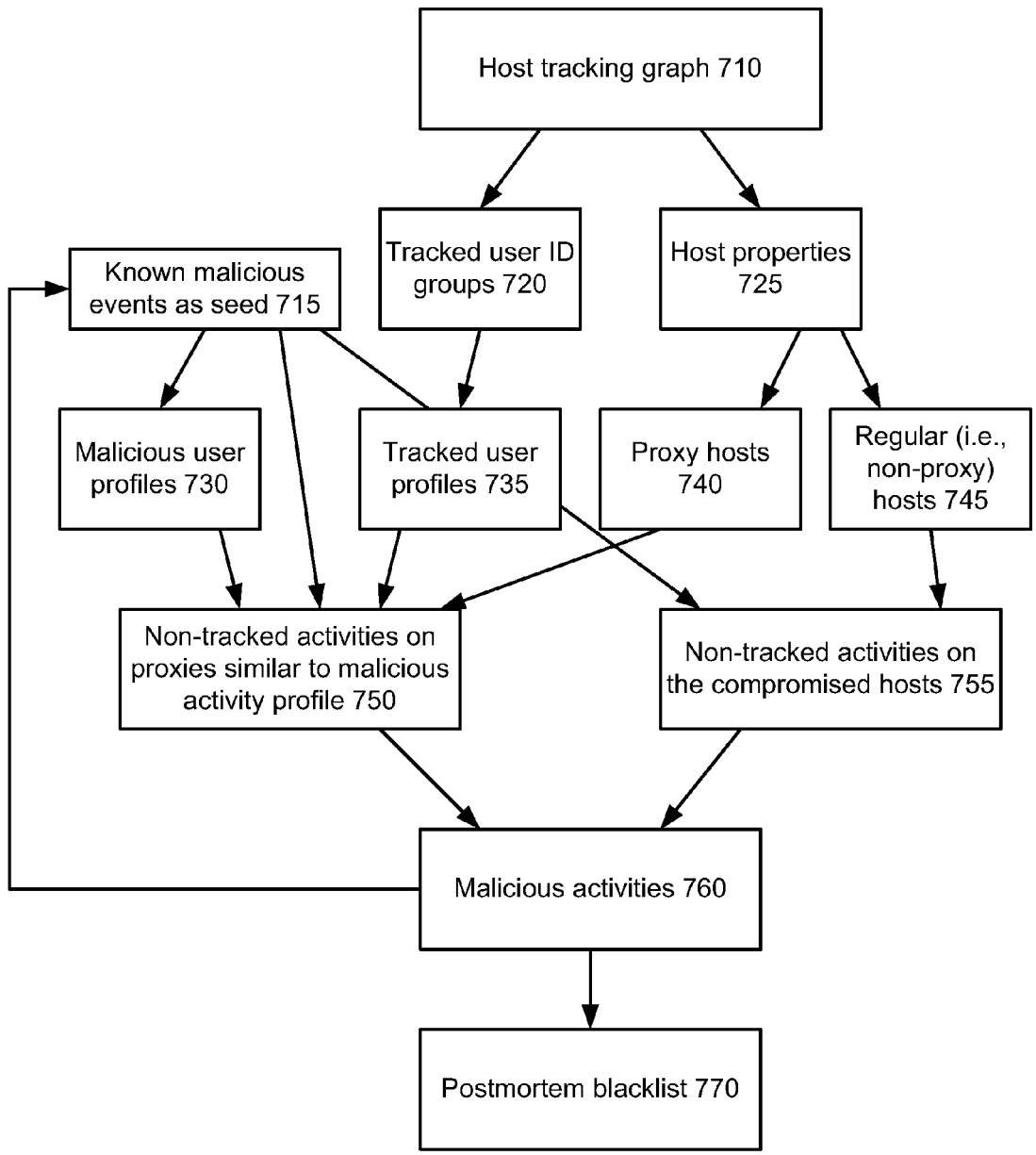
FIG. 7 illustrates an example flow that may be used in the determination of a postmortem blacklist.
Figure 8:
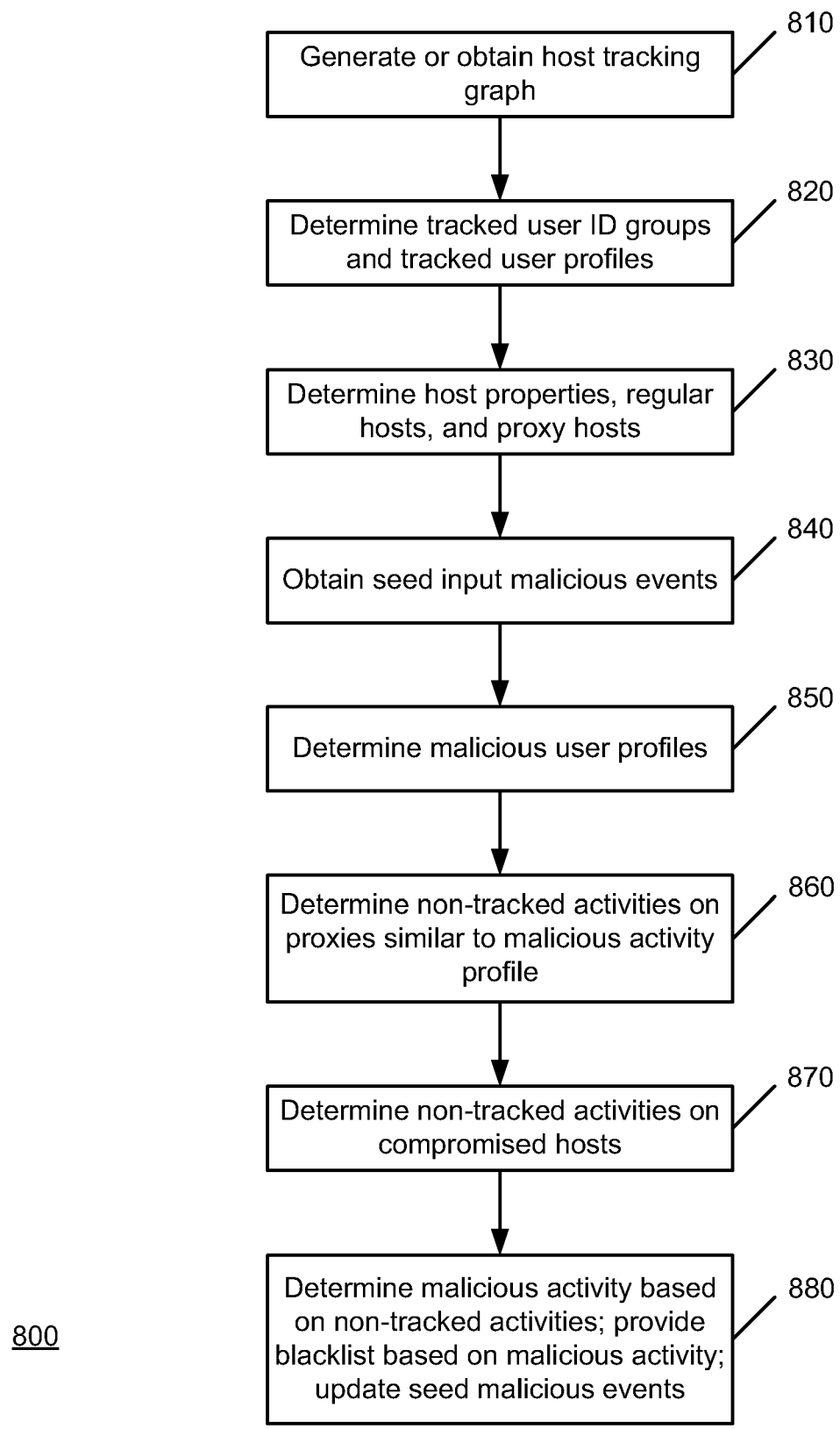
FIG. 8 is an operational flow of an implementation of a method of generating and using a postmortem blacklist.

Postmortem forensic analysis can be used to identify additional malicious activities using known malicious activities as seeds. In addition, it can be used to identify previously not detected attacks for other applications. FIG. 7 illustrates an example flow 700 that may be used in the determination of a postmortem blacklist, and FIG. 8 is an operational flow 800 of an implementation of a method of generating and using a postmortem blacklist.

A host tracking graph 710 may be generated or obtained at 810, e.g., from a host tracking system such as the host tracking system 500 of FIG. 5. The host tracking graph 710 may be used to determine tracked user ID groups 720 at 820. Techniques such as those described above with respect to the method 400 may be used to determine the tracked user ID groups 720. Tracked user profiles 735 may be determined using information about the tracked user ID groups 720. The tracked user profiles 735 may comprise characteristics about the user IDs in the tracked user ID groups 720.

The host tracking graph 710 may be used to determine host properties 725 at 830. The host properties 725 may comprise characteristics of the hosts of the host tracking graph 710. Proxy hosts 740 and regular (i.e., non-proxy) hosts 745 may be determined or inferred using information about the host properties 725.

To perform forensic analysis, inputs may be used. In an implementation, the inputs may comprise known malicious events (e.g., bad accounts) as seeds and the host tracking graph 710, including information on the host IP binding durations and the host types (e.g., tracked hosts and proxy hosts). Known malicious events may be used as seed 715 in the determination of a postmortem blacklist. At 840, previously detected malicious events may be obtained (e.g., from storage) as seed input malicious events. Malicious user profiles 730 may be determined at 850 using the seed malicious events.

At 860, non-tracked activities on proxies having a profile similar to a profile of a malicious activity may be determined, e.g., by comparing the profiles of the activities to the profiles of malicious activities. The profiles of malicious activities may be determined using information pertaining to the malicious user profiles 730, the seed 715 malicious events, the tracked user profiles 735, and the proxy hosts 740.

At 870, non-tracked activities on compromised hosts may be determined. Such a determination may be made using information pertaining to the seed 715 malicious events and the regular (non-proxy) hosts 745. Malicious activities 760 may be determined at 880 using the non-tracked activities determined at 860 and 870. A blacklist 770 may be generated based on the determined malicious activities 760. The blacklist 770 is a postmortem blacklist. Information pertaining to the malicious activities 760 may be added to the seed 715 malicious events for future use In determining malicious activities.

Regarding forensics for tracked hosts, suppose a malicious activity is discovered at time t at a tracked host. This indicates that the corresponding host is compromised. The host tracking information may be used to trace this host's past host IP bindings from the current time back to the time t and to mark the activities during this period as suspicious.

In an implementation, a host IP binding window marked as suspicious can serve as a criterion for identifying malicious traffic. For example, if a host is suspected of being compromised, all the port 25 mail relay traffic from this host can be treated as suspicious. However, for some applications, this criterion is too coarse because there can be legitimate user activities on compromised hosts. In such a case, the ID grouping information may be used. For example, activities of a tracked ID with a long history are more likely to be legitimate than activities of untracked IDs.

Using this approach and seed malicious user IDs, additional malicious user IDs may be identified. Various criteria may be used to evaluate a false positive rate, including comparing with a whitelist of premium (e.g., approved) user account list, checking their signup dates, verifying their naming patterns, and manual verification. In practice, if normal user profiles built based on tracked user IDs are used, the false positive cases may be further eliminated.

Regarding forensics for proxies, when a malicious activity is detected from a proxy-like host IP binding, it cannot be blindly blocked as many legitimate users could use the same IP address as well. In such a case, the tracked user profile may be used to filter potential false positives.

Figure 9:
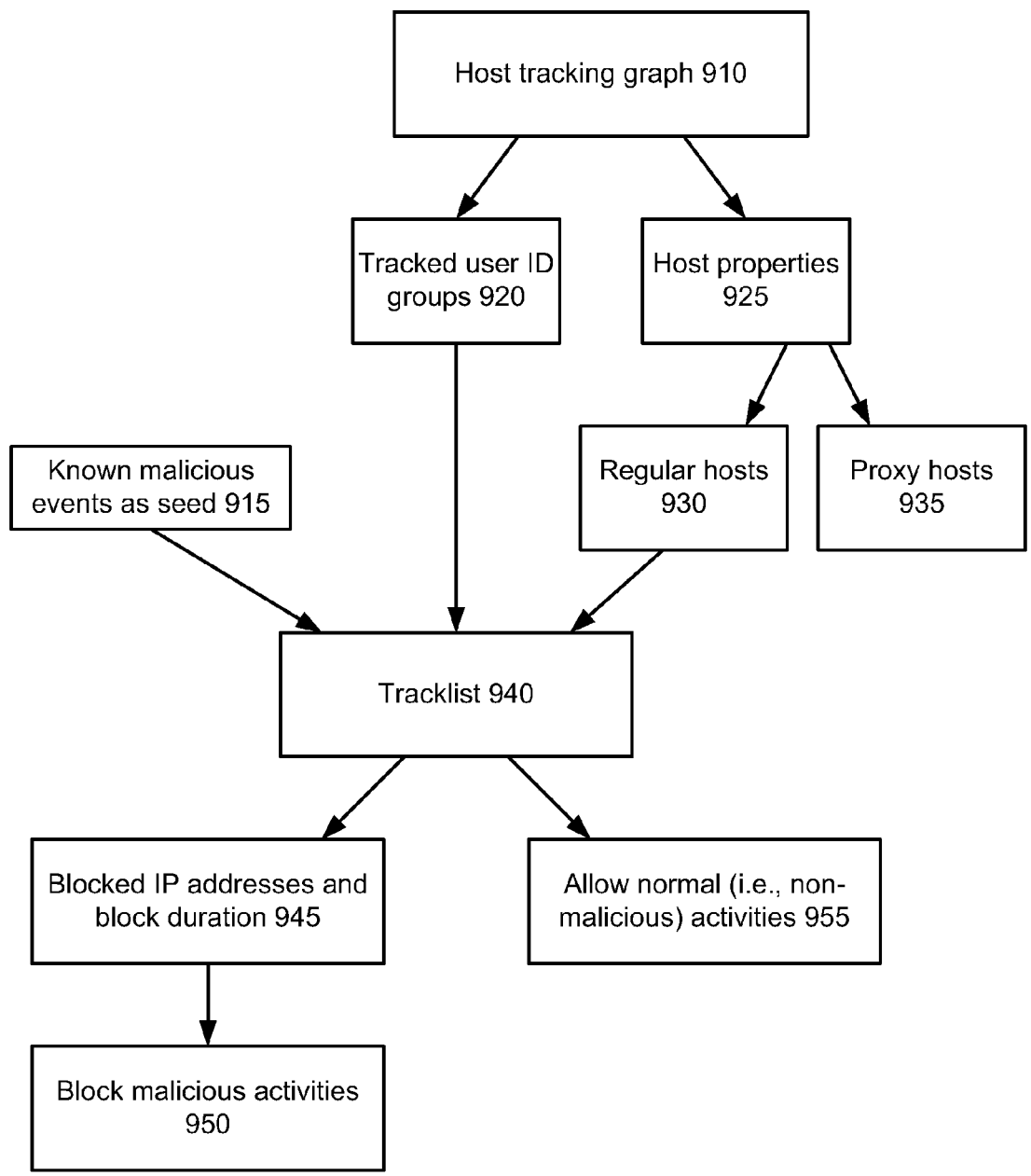
FIG. 9 illustrates an example flow that may be used in the determination of a tracklist.
Figure 10:
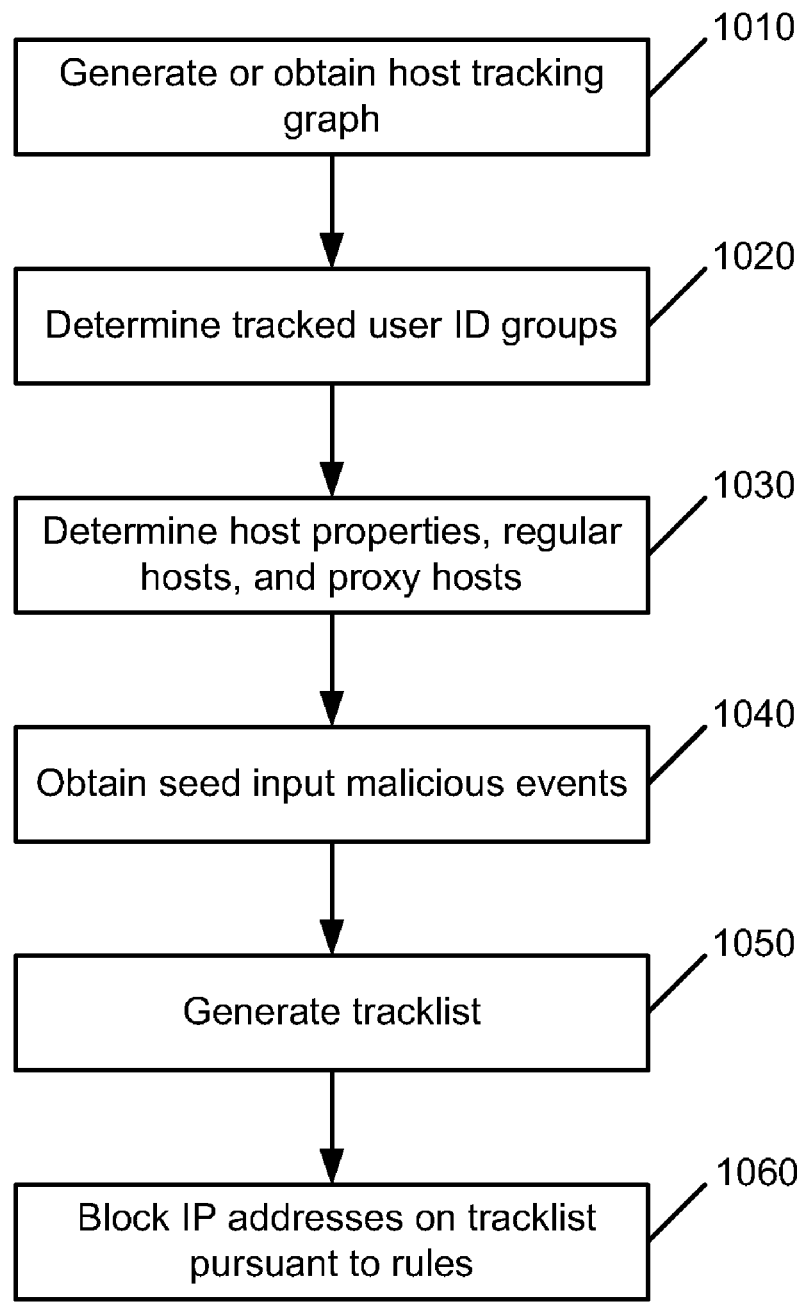
FIG. 10 is an operational flow of an implementation of a method of generating and using a tracklist.

Thus, a postmortem blacklist 770 may be generated. In an implementation, the host tracking information can be leveraged to generate a tracklist (e.g., a host-aware blacklist) and block malicious traffic in realtime. The tracklist does not use prior information on the host IP bindings beforehand. FIG. 9 illustrates an example flow 900 that may be used in the determination of a tracklist, and FIG. 10 is an operational flow 1000 of an implementation of a method of generating and using a tracklist.

At 1010, a host tracking graph 910 may be generated or obtained, using the host tracking system 500, for example. The host tracking graph may be used to determine tracked user ID groups 920 at 1020 and host properties 925 at 1030. Regular hosts 930 and proxy hosts 935 may be determined using information about the host properties 925.

Known malicious events may be used as seed 915 in the determination of a tracklist 940. At 1040, previously detected malicious events may be obtained as seed input malicious events.

At 1050, a blacklist 940 may be generated using information pertaining to the seed 915 malicious events, the tracked user groups 920, and the regular hosts 930. The blacklist 940 is a tracklist. The tracklist 940 comprises information about IP addresses to block and information (e.g., rules) about a duration (e.g., of time, such as a blocking time) each IP address is to be blocked 945. Using the information of the tracklist 940, malicious activities are blocked 950 and normal (i.e., non-malicious) activities are allowed (e.g., let through) 955. The IP addresses on the tracklist 940 are blocked pursuant to the rules at 1060.

When a malicious activity associated with a host is detected, it may be determined whether there was a recent tracked user ID activity. If so, it may be inferred that the host associated with the tracked user ID is a compromised host. In this case, the current IP address of the corresponding host may then be blocked. The use of tracklists can follow host IP binding changes by following tracked user activities, and hence can blacklist malicious activities despite the change of IP addresses. In an implementation, to avoid over aggressively blocking subsequent legitimate activities, this IP address may stop being blocked under either of two conditions: (1) the tracked user associated with the compromised host moves to another IP address (at which point, the new IP address may be blocked because the tracklist 940 is able to track the malicious host's activities even as their IP addresses change), or (2) a different tracked user starts using this IP address.

A blocking time may be based on a dynamic IP switch time and host tracking information. In an implementation, an IP address is blocked for a short period of time (e.g., 15 minutes, one hour, two hours, one day, etc.) as soon as malicious activity is detected. This reduces the number of normal users who may be blocked (who are sharing the same hosts with compromised user ID IP addresses). In an implementation, the tracked users may be derived from history and their normal access to a host may be permitted even to an IP address that is otherwise blocked.

Figure 11:
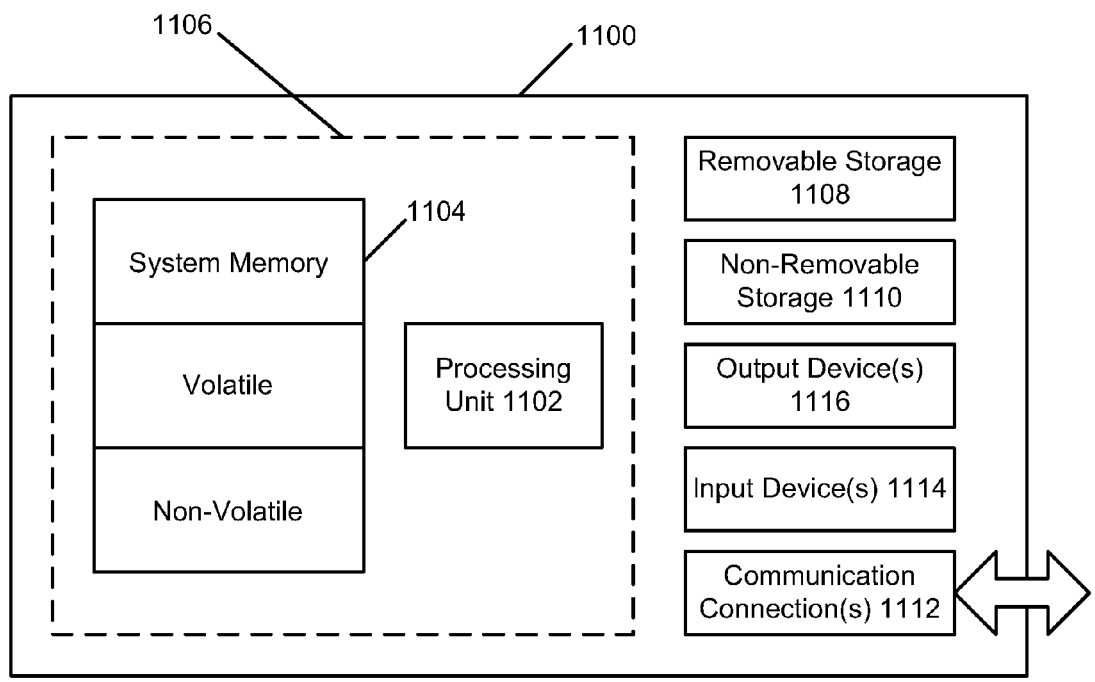
FIG. 11 is a block diagram of an example computing environment in which example embodiments and aspects may be implemented.

FIG. 11 shows an exemplary computing environment in which example embodiments and aspects may be implemented. The computing system environment is only one example of a suitable computing environment and is not intended to suggest any limitation as to the scope of use or functionality. Numerous other general purpose or special purpose computing system environments or configurations may be used. Examples of well known computing systems; environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 11, an exemplary system for implementing aspects described herein includes a computing device, such as computing device 1100. Computing device 1100 depicts the components of a basic computer system providing the execution platform for certain software-based functionality in accordance with various embodiments. Computing device 1100 can be an environment upon which the host tracking system 500 for determining a host tracking graph and performing host tracking from various embodiments is instantiated. Computing device 1100 can include, for example, a desktop computer system, laptop computer system or server computer system. Similarly, computing device 1100 can be implemented as a handheld device (e.g., cellphone, etc.) Computing device 1100 typically includes at least some form of computer readable media. Computer readable media can be a number of different types of available media that can be accessed by computing device 1100 and can Include, but is not limited to, computer storage media.

In its most basic configuration, computing device 1100 typically includes at least one processing unit 1102 and memory 1104. Depending on the exact configuration and type of computing device, memory 1104 may be volatile (such as random access memory (RAM)), non-volatile (such as read-only memory (ROM), flash memory, etc.), or some combination of the two. This most basic configuration is illustrated in FIG. 11 by dashed line 1106.

Computing device 1100 may have additional features/functionality. For example, computing device 1100 may include additional storage (removable and/or non-removable) including, but not limited to, magnetic or optical disks or tape. Such additional storage is illustrated in FIG. 11 by removable storage 1108 and non-removable storage 1110.

Computing device 1100 typically includes a variety of computer readable media. Computer readable media can be any available media that can be accessed by device 1100 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1104, removable storage 1108, and non-removable storage 1110 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer storage media may be part of computing device 1100.

Computing device 1100 may contain communications connection(s) 1112 that allow the device to communicate with other devices. Computing device 1100 may also have input device(s) 1114 such as a keyboard, mouse, pen, voice input device, touch Input device, etc. Output device(s) 1116 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A blacklisting method, comprising:
obtaining a plurality of host properties of a plurality of hosts with a host tracking system, wherein obtaining the plurality of host properties comprises obtaining a host tracking graph, wherein the host tracking graph comprises data pertaining to the hosts and bindings of the hosts to a plurality of Internet protocol addresses over time;
obtaining information pertaining to a plurality of suspicious events; and
determining a blacklist at a computing device using the host properties and the information pertaining to the suspicious events;
determining a plurality of user profiles, a plurality of proxy hosts, and a plurality of non-proxy hosts using the host tracking graph;
wherein determining the blacklist comprises:
determining a plurality of non-tracked activities using the host tracking graph and information pertaining to the proxy hosts and the non-proxy hosts;
determining a plurality of tracked identifier groups; and
determining the blacklist using the suspicious events and the tracked identifier groups.

2. The method of claim 1, further comprising determining the plurality of tracked identifier groups and the plurality of host properties using the host tracking graph.

3. The method of claim 2, wherein the host properties are associated with proxy hosts.

4. The method of claim 3, further comprising updating the blacklist by removing tracked users from the blacklist using the tracked identifier groups and the host properties.

5. The method of claim 4, wherein the blacklist comprises a plurality of Internet protocol addresses that are to be blocked and a duration of time that each of the Internet protocol addresses is to be blocked.

6. The method of claim 5, wherein the duration of time is based on information of the host tracking graph.

7. The method of claim 4, further comprising blocking an Internet protocol address until a tracked user associated with a compromised host of the Internet protocol address moves to a different Internet protocol address.

8. The method of claim 7, further comprising unblocking the Internet protocol address and blocking the different Internet protocol address of the compromised host.

9. The method of claim 4, further comprising blocking an Internet protocol address on the blacklist, and unblocking the Internet protocol address when a tracked user starts using the Internet protocol address.

10. A blacklisting system, comprising:
a host tracking system, comprising
an identifier analyzer that groups a plurality of identifiers into a plurality of identifier groups, wherein each identifier group comprises at least one of the identifiers, and each identifier pertains to at least one event of a user with respect to one of a plurality of hosts; and
a host tracking graph generator that constructs a host tracking graph using the identifier groups, wherein the host tracking graph comprises data pertaining to the hosts, and wherein the host tracking graph further comprises data showing the hosts and bindings of the hosts to a plurality of Internet protocol addresses over time; and
a computing device that obtains information pertaining to a plurality of suspicious events and determines a blacklist using the host tracking graph and the information pertaining to the suspicious events;
wherein the host tracking system determines a plurality of user profiles, a plurality of proxy hosts, and a plurality of non-proxy hosts using the host tracking graph, and the computing device determines a plurality of non-tracked activities using the host tracking graph and information pertaining to the proxy hosts and the non-proxy hosts, determines a plurality of tracked identifier groups, and determines the blacklist using the suspicious events and the tracked identifier groups.

11. The system of claim 10, wherein the host tracking system determines a plurality of tracked identifier groups and a plurality of host properties using the host tracking graph.

12. The system of claim 11, wherein the computing device is adapted to block an Internet protocol address on the blacklist until a tracked user associated with a compromised host of the Internet protocol address moves to a different Internet protocol address, then unblock the Internet protocol address and block the different Internet protocol address of the compromised host.

13. The system of claim 11, wherein the computing device is adapted to block an Internet protocol address on the blacklist, and to unblock the Internet protocol address when a tracked user starts using the Internet protocol address.

14. A blacklisting method, comprising:
generating a host tracking graph using a host tracking system;
determining a plurality of tracked identifier groups and a plurality of host properties using the host tracking graph at the host tracking system;
determining a blacklist at the host tracking system using the host tracking graph, the tracked identifier groups, the host properties, and information pertaining to a plurality of suspicious events, wherein the host tracking graph comprises data showing the hosts and bindings of the hosts to a plurality of Internet protocol addresses over time;
determining a plurality of tracked user profiles using the host tracking graph:
identifying false suspicious events using the tracked user profiles; and
updating the blacklist using the identified false suspicious events.

15. The method of claim 14, wherein the blacklist is one of a postmortem blacklist used to identify a plurality of malicious activities according to a forensic analysis or a tracklist used to track an activity of a compromised host.

* * * * *